Nov. 6, 1928.                    S. B. REDFIELD                    1,690,836

PLATE VALVE

Filed June 29, 1926

INVENTOR
Snowden B. Redfield
BY
HIS ATTORNEY

Patented Nov. 6, 1928.

1,690,836

UNITED STATES PATENT OFFICE.

SNOWDEN B. REDFIELD, OF EASTON, PENNSYLVANIA, ASSIGNOR TO INGERSOLL-RAND COMPANY, OF JERSEY CITY, NEW JERSEY, A CORPORATION OF NEW JERSEY.

PLATE VALVE.

Application filed June 29, 1926. Serial No. 119,353.

This invention relates to valves for air compressors of the type known to the art as plate valves, in which some form of thin disc or plate is held between a valve seat and a back stop and which has a lift from its seat of only a small fraction of an inch. It relates more particularly, however, to an improvement in plate valves for small compressors, in the design of which certain limitations have caused the usual amount of breakage of the valve plate and guide. Without going into a detailed history of the plate valve, it can aptly be pointed out here that a plate valve for a small air compressor, of twelve inch stroke or less, must be of small diameter in order to fit the size of the cylinder, and cut down the clearance.

At the same time the amount of lift has to be the same as the lift in a large diameter valve, if not more, since only one circular valve port can be used in a small valve. This means that the valve guide plate, which is necessary in order to insure the return of the valve plate to its seat must flex considerably in proportion to the small radial length of the arms. This can be insured if the right tempered steel is used. The steel for the valve plate itself, however, must be such that the valve plate will not flex, but will retain its shape under all conditions, in order to seat on the valve seat properly and eliminate breakage.

Therefore, to meet this difficulty flexible guiding arms hav been riveted to the valve plate, which in turn could then be formed of the proper non-flexing steel. But here the rivets have broken and have caused breakage of the valve plate. The object of my invention therefore is to eliminate all these difficulties by providing a valve assembly wherein the valve plate and the guide plate can be of different materials and rivets can be eliminated while the proper seating of the valve plate is insured and leakage is eliminated.

Figure 3:
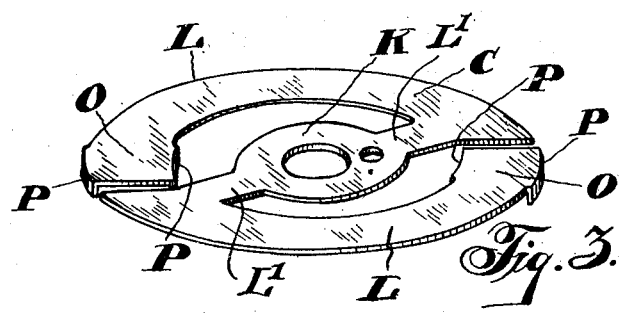
Figure 2:
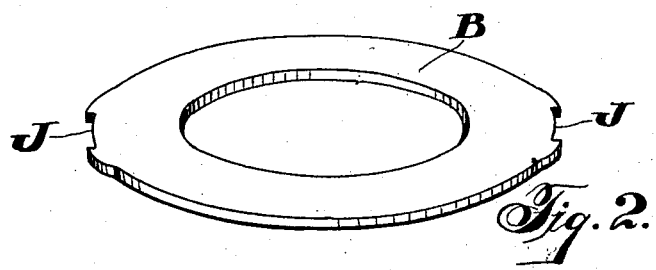
Figure 1:
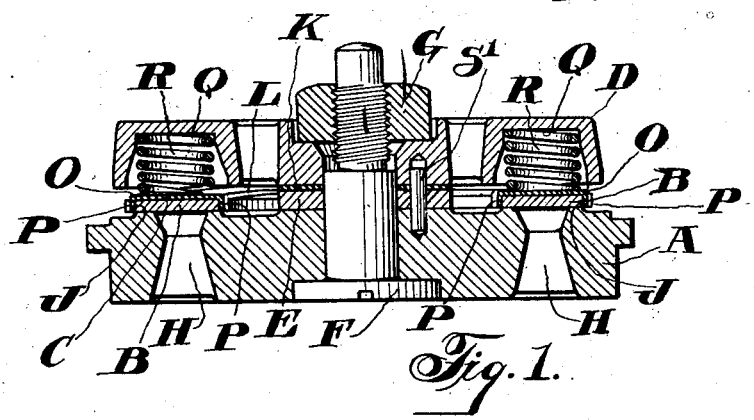

My invention consists of the features of novelty and combination of elements defined in the appended claim, described in the specification and illustrated in the drawings, in which Figure 1 is a cross sectional view of the valve assembly and plate valve, Figure 2 is a detailed illustration of the valve disc, and Figure 3 is a detailed illustration of the guide plate, both the latter being in three dimensional perspective.

Referring to the drawings the usual valve assembly is shown in Figure 1 with the valve seat A, an annular valve disc B, a valve guide plate C and a washer E, the whole being held together by the usual bolt F and the nut G. The annular valve disc is in the form of a flat ring adapted to lie over the ports H in the valve seat A. On the outside circumference of the valve disc B are cut notches or grooves J preferably opposite to each other. The guide plate C is of the usual construction embodying a central hub K adapted to fit upon the bolt F while extending from the hub K are the two arms L'. At the extremities of the arms L' are formed arcuate extensions L substantially a semi-circumference in length which are adapted to be super-imposed over the valve disc B. At the ends O of the extensions L tongues or ears P have been formed, preferably by stamping, on one side or both the inside and the outside edges of the extensions L to fit into the grooves J in the valve disc B and they are adapted to fit over the grooves J in the disc. Pockets Q are also formed in the stop plate, above the valve disc B and coil springs R are inserted therein. The assembly of the valve is as follows:

The valve disc B is placed over the ports H, the valve guide plate C is then super-imposed upon the valve disc B, the tongues or ears P fitting into the ends or grooves J of the valve disc. The said stop plate D with the springs R placed in the pockets Q is super-imposed upon the guide plate C, the springs R pressing upon the ends O of the arcuate extensions L of the valve guide plate and indirectly upon valve disc B. A dowel pin S', shown in the drawings, placed in the valve seat and holding the washer E, guide plate C and stop plate D in position can be used to make the assembly of the valve easier. In operation the valve disc B is lifted vertically from its seat when the compression in the cylinder is sufficient to overcome the pressure exerted on the valve by the air in the other side and the coil springs R. At the end of the compression and discharge stroke it is returned to its seat. As a direct result of the tongues P on the spring guide plate C fitting into the grooves J on the valve disc B, no movement of the valve disc other than in a vertical plane is possible and the valve always returns to the same position relative to the port area, so that what is known in the art as a "seat" is quickly formed and loss of efficiency through the escape of air on account of minute irregularities on the surface of the valve seat is eliminated.

In this specification, a valve assembled for use as a discharge valve has been described and illustrated in the drawings. The invention is susceptible in its present form of being readily applied to an inlet valve, the only necessary changes being a mere alteration of the position of certain parts.

I claim:

An improvement in plate valves for compressors comprising a valve seat, a plate valve in the form of a flat ring adapted to super-impose and to cover the port area on the said valve seat, notches in the edge of said plate valve, a valve guide having a flat upper surface and radial arms having arcuate extensions for normally holding said plate valve against its seat, and ears formed on the extremities of said extensions for forming loose continual engagement with the said notches in the plate valve, a stop plate, pockets in said stop plate, and springs in said pockets bearing upon the extremities of the said guide plate and indirectly upon the said plate valve.

In testimony whereof I have signed this specification.

SNOWDEN B. REDFIELD.